Figure 1:
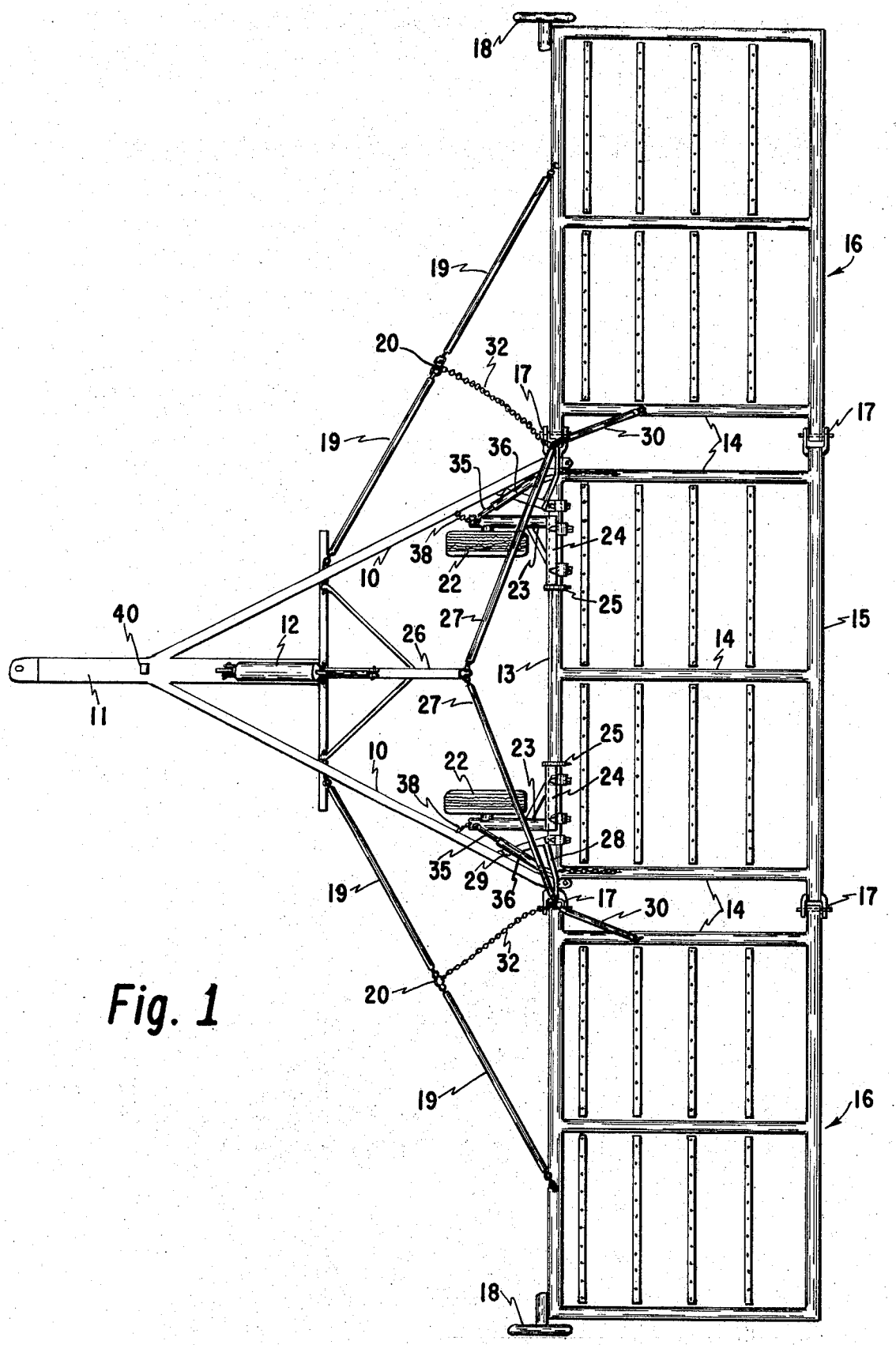

United States Patent [19]
Peterson

[11] 3,810,660
[45] May 14, 1974

[54] FOLDING IMPLEMENT CART

[76] Inventor: Harold B. Peterson, Larchwood, Iowa 51241

[22] Filed: July 21, 1972

[21] Appl. No.: 274,112

[52] U.S. Cl............. 280/411 A, 172/311, 172/456, 280/476 A
[51] Int. Cl. ..................... B62d 53/00, A01b 19/04
[58] Field of Search............ 280/39, 38, 34 R, 34 A, 280/413, 412, 411, 491 C; 172/456, 311

[56] References Cited
UNITED STATES PATENTS

| | | |
|---|---|---|
| 1,435,107 | 11/1922 | Cox................................ 280/411 R |
| 3,190,367 | 6/1965 | Kopaska ......................... 280/412 X |
| 3,460,631 | 8/1969 | Friesen ........................... 280/411 A |
| 3,637,027 | 1/1972 | Kovar ................................ 280/412 |

Primary Examiner—David Schonberg
Assistant Examiner—Reinhard J. Eisenzopf

[57] ABSTRACT

A folding cart for an agricultural drag. The cart includes a center section and lateral wings all of which are raised and the wings of which swing together under the influence of a single actuating device. Novel means for raising the cart and pulling the wings into place are provided.

11 Claims, 5 Drawing Figures

FOLDING IMPLEMENT CART

BACKGROUND AND SUMMARY OF THE INVENTION

This invention pertains to carrying devices for agricultural implements and more particularly to a device for carrying an agricultural drag or harrow.

The dimensions of modern agricultural equipment has rapidly increased with the increase in the size of tractors available to operate the equipment. This increase has affected all types of equipment, and has made difficult the transportation of some types of equipment when it is not in use. The drag or or harrow is one example of the problem.

The drag ordinarily consists of a series of sections pulled behind a tractor to break up large pieces of earth, to level small irregularities in the ground and to cover seed after it has been sowed. Each section includes a series of bars bearing teeth adapted to scrape over and cut into the earth. Modern drags may be as much as 25 to 30 feet wide and sometimes more. Thus, transportation on roads and highways becomes almost impossible.

In order to provide transportation at all, it is necessary to make the drag in sections so that it can be folded or transported in sections. The usual method of transportation is to fasten the drag to a carrier having wheels, lift the drag and fold the articulated outer sections or wings to provide a rig of reasonable width.

Ordinarily the outer sections are folded upwardly to a vertical triangular shape because this is the simplest direction in which to move the pieces. However, considerable power is required to lift the outer wings, and the folded profile is quite tall for the larger drags so that as size increases, this mode becomes less attractive.

By my device, I provide a carrier in which the entire drag is raised on edge and the wings then folded forwardly so that only the length is increased with larger drags. Overall length is not yet a problem. I accomplish the tilting and folding by using a single actuator to provide power and motion not only to raise the drag on edge and to fold it, but also to raise the cart relative to the wheels. Also the unfolding and lowering is completely power controlled so that the device is under complete control at all times.

FIGURES

Figure 2:
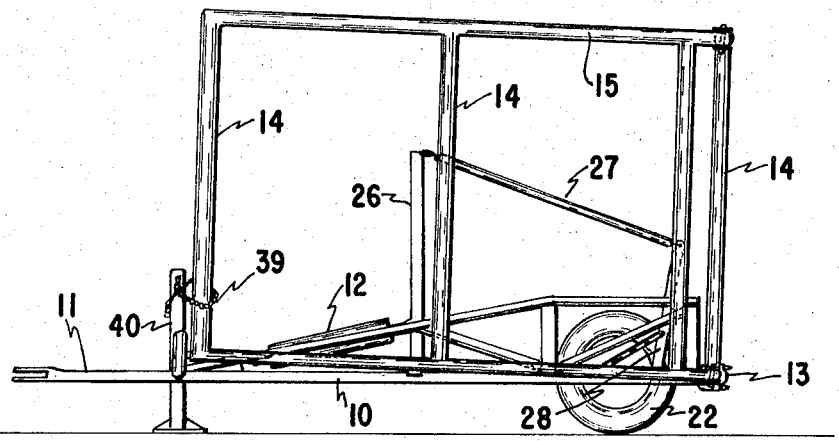
Figure 3:
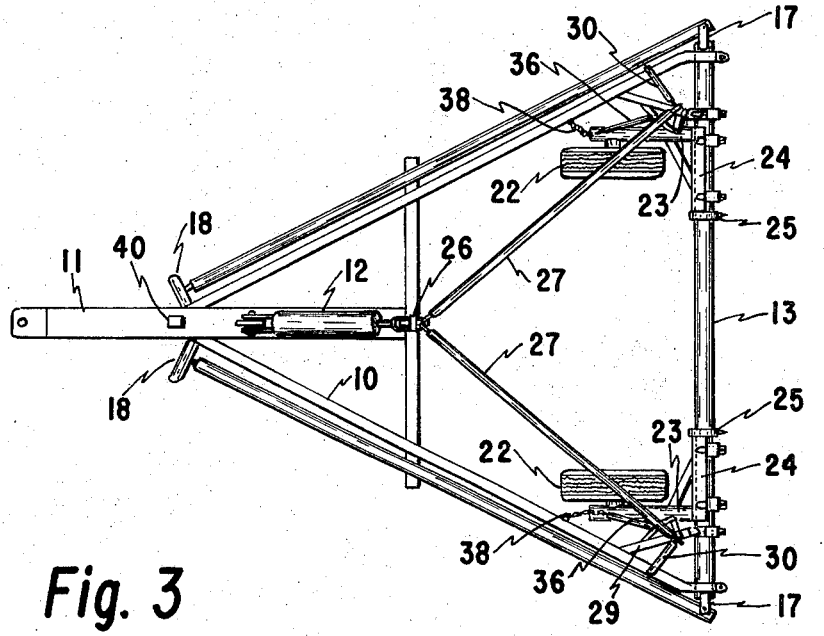
Figure 4:
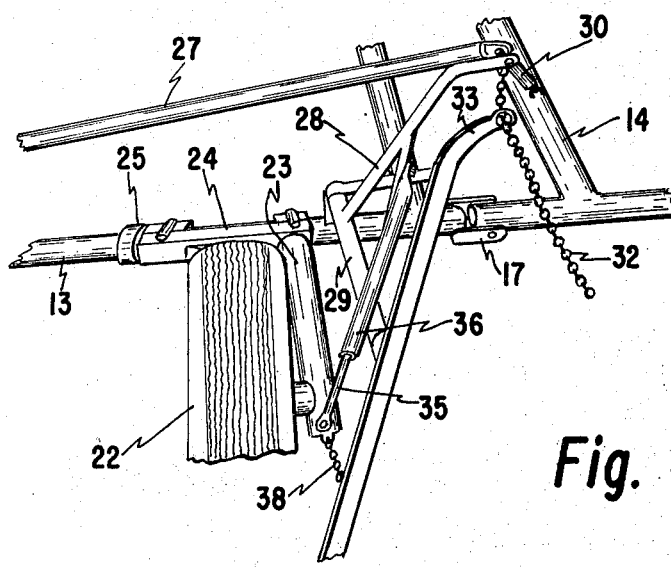
Figure 5:
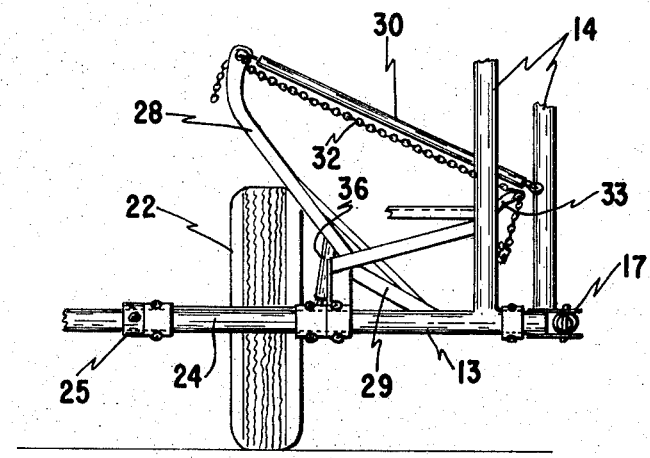

FIG. 1 is a top plan view of my device showing the drag attached to the carrier, FIG. 2 is a side elevational view with the wings folded without the drag, FIG. 3 is a top plan view of the carrier folded, FIG. 4 is a detailed pictorial view to an enlarged scale showing the mechanism at the folding joint, and FIG. 5 is a rear elevational view of the mechanism shown in FIG. 4.

DESCRIPTION

Briefly my invention comprises an improved carrier for an agricultural drag. The device uses only a single power source and working through a linkage operates to raise the carrier, fold the carrier into roadable size and raise the carrier to a reasonable height above the roadway so that it can be readily transported over farm roads.

More specifically and referring to the figures, I provide a carrier having a basic triangular frame composed in part of two diagonal members 10. A tongue 11 attached to the frame provides the means by which the device is pulled and also a convenient mounting for the hydraulic piston and cylinder assembly 12 which provides all the power for the device.

The rear member 13 of the triangular frame is pivotally journalled in the ends of the other two diagonal members 10. Thus, it can rotate about its longitudinal axis. A framework of bars 14 running longitudinally of the machine and an end bar 15 across the ends of those bars completes the center section of the carrier.

The wings 16 of the carrier are similarly constructed and are hinged at 17 to the center section. Wheels 18 may be provided at the outer ends of the wings for added support. Jointed braces 19 linked loosely together at 20 and loosely connected to the frame 10 and the outer sections are provided to assure proper pulling of the entire assembly when it is spread out and being used to drag. Since the wings are attached to the member 13, both they and the center section can be tipped upward by the rotation of that member. Also, because of the pivotal connection between the wings 16 and the center section, the wings can be folded in toward that section.

The carrying means includes a pair of wheels 22 journalled on an axle forming part of a carrier bracket 23. This bracket is also journalled on the rear member 13 by a sleeve bearing 24 so that the rear member 13 may be rotated upward or downward relative to the wheels 22. This also allows the position of the bracket 23 to be changed relative to the frame 10 as will appear later. A collar 25 or a pair of collars may be clamped to the member 13 to keep the bracket 23 at its proper location on that member.

The mechanism which provides the tilting and folding action of the carrier includes a pair of pulling bars 27 loosely fastened preferably by means of a clevis and eye type fastener to the end of an operating lever 26 which is operated by the operating member of the hydraulic unit 12. The pulling end of the bar 27 is also loosely fastened by similar means, in this case to a lever 28 (FIG. 4). The lever 28 is built up to be relatively rigid and includes a bearing pipe 29. This pipe is journalled on an axle so that the lever pivot axis is almost longitudinal of the carrier.

For most satisfactory operation, this pivot axis must be along a line tilted so that it is higher at the front (away from the tongue) and angled slightly outwardly toward the rear when viewed from above. This construction provides for the most efficient pulling on the wings 16 as will later appear.

The lever 28 is the central operating member of the entire device. To it are connected various operating means to move the wheels 22 relative to the carrier frame 10; to tilt the frame upward, and to fold the frame. In this respect, the lever 28 also acts to change the direction of pull on the wings 16 so that they will be tilted and folded by the same force.

In order to accomplish the lifting and folding, I provide a link 30 engaged between the lever 28 and a bar 14 on the wings. The connection between the link and the bar must be located at a point well below the connection between the link 30 and the lever 28 when the drag is down in the operating position, and must be outboard of the pivotal connection 17. Thus, a pull by the lever 28 has a tendency to pull the other end of the link upward. The outboard connection provides a component of force tending to pull the wings inward as well as upward — particularly as the lever 28 moves in response to a pull on the bar 27. Thus, the entire carrying frame including both wings is tilted upward, and then the wings fold forward till they provide a relatively compact package to be driven down the road.

The folding of the wings also requires that the pulling braces 19 be folded. Since they are jointed, the folding causes no problem. In order to hold the jointed ends up, however, it is necessary to provide a chain 32 running from the joint between the braces 19 through a guide 33 (FIG. 4) to the lever 28. Thus, the lever 28 by its operation not only tilts and folds the main carrying frames, but also pulls the chain to hold the braces above the ground as the device is towed.

There is one other function of the lever 28. As noted earlier, the wheel bracket 23 is journalled on the member 13. Therefore, in order to provide any support, additional bracing is necessary. I provide this bracing by means of a telescoping brace connected to the lever 28. This brace is composed of an inner member 35 telescoped into the outer tube 36. One of the two members is fixed to the bracket 23 and the other to the lever 28. The connection to the bracket 23 must be free enough to allow both a tilting and pivotal motion. The tube is proportioned so that it will strike the supporting member for the inner member 35 somewhat before the lever 28 has completed its full travel, and for the rest of the travel, there is a pushing movement by this tube which has the effect of pushing the wheel bracket 23 downward with respect to the frame. This downward push, when applied to the wheels, actually raises the frame 10 so that when the device is folded the frame also rises to give greater road clearance and therefore better roadability. Thus, there is free travel of the tube 36 for a part of its movement, and an operating movement against the inner member 35 for a portion of the movement, thereby providing a lost motion means for the lifting action on the cart. In order to provide proper placement of the wheel bracket 23 while the drag is in use in the lowered position, I use a chain 38 between the end of the bracket and the frame 10. This chain acting as a restraining means, prevents undue movement of the bracket 23 and wheels 22 while the drag is operating.

For transportation over relatively long distance or when the device is not in use and it is desired to remove the hydraulic cylinder, it may be desirable to hold the wings together at their forward end. For this purpose, I use a chain 39. The post 40 to which the chain 39 may be fastened may also house a front jack adapted to be lowered to support the tongue 11 when the device is not in use.

The operation of the device should be fairly obvious from the description thus far. When the device is connected to the pulling tractor, the hydraulic mechanism is also connected to the tractor hydraulic system. If it is desired to raise the drag, the hydraulic mechanism 12 is actuated by the proper control on the tractor.

As the hydraulic mechanism contracts, the lever 26 multiplies the motion and the bars 27 are pulled. They in turn move the levers 28. Operation of these levers serves to tilt up the drag and to fold it as explained before. Also, as the drag is folded, the entire cart is raised by the pressure on the wheel brackets 23 so that the cart is ready to pull down the road. The drag is lowered into position by the exact reverse of the process. If the tractor is capable of actuating a double acting hydraulic cylinder, it would be possible to have complete control of the movements of the drag in either direction. Otherwise the control of the lowering of the drag can be accomplished simply by controlling the rate at which the hydraulic fluid drains from the cylinder.

I claim:

1. An agricultural implement carrier comprising a wheel mounted frame, jointed carrier means at least one section of which is pivotally mounted on said frame and at least one section of which is pivotally connected to the first named section, and actuating means connected between said frame and the second named section whereby said acutating applies force to said second named section to cause pivotal motion between sections and between said first named section and said frame.

2. The device of claim 1 in which said frame is composed of a pair of diagonal members and a rear bar pivotally journalled in portions of said diagonal members, said rear bar thereby also forming a part of said first named section.

3. The device of claim 1 in which said actuating means includes at least one lever pivotally mounted relative to said frame, pulling means attached to said lever and link means engaged between said lever and said second named section, said lever being positioned to change the direction of pulling force from said pulling means through said link means.

4. The device of claim 3 in which said link means is attached to said second named section at a point substantially outboard of the pivotal axis between said sections.

5. The device of claim 3 in which said wheel mounting includes bracket means pivotally mounted on said frame, wheels rotatably mounted on said bracket means, telescoping lost motion means attached between said lever and said bracket means so that full motion of said lever forces said bracket means in a direction to raise said frame relative to said wheels.

6. The device of claim 3 in which jointed brace means are connected between said frame and each of said second named sections to support said second named section in a pulled relationship with said frame, and flexible means attached to said brace means and to said actuating means whereby said brace means are supported when said actuating means is operated to pivot said sections.

7. The device of claim 1 in which said wheel mounting includes bracket means pivotally mounted on a part of said frame, wheels rotatably mounted on said brackets, and said actuating means includes lost motion means attached to said bracket means adapted to move said bracket means to raise said frame as said sections are moved relative to said frame.

8. The device of claim 1 in where there are two of said second named sections, each one pivotally attached to an end of the center or first named section, and in which said actuating means comprises a hydraulic piston-cylinder assembly mounted on said frame, a motion-multiplying lever mounted on said frame and operably attached to said hydraulic assembly, a pair of motion direction changing levers pivotally mounted on said frame on an axis almost longitudinal of said frame, pulling means engaged between said motion multiplying lever and each direction changing lever, link means loosely fastened to each direction changing lever and to a junction point on each of said second named sections, said junction points being located lower than the connection between said link and said direction changing lever and outboard of the pivotal axis between sections.

9. The device of claim 8 in which said wheel mounting includes a pair of wheel support brackets pivotally journalled on said frame, wheels rotatably mounted on said brackets telescoping lost motion means operably connected between each direction changing lever and a wheel support bracket whereby said direction changing lever moves free of said wheel bracket for a portion of its travel, but for the rest of its travel presses said wheel in a downward direction resulting in a lifting of said frame, and restraining means connected between said frame and each bracket to prevent over travel of said bracket.

10. The device of claim 9 in which a jointed brace is connected between said frame and each said second-named section and flexible supporting means engaged between said braces and said direction changing lever whereby said direction changing lever acts to move said supporting means to support said braces when folded.

11. The device of claim 8 in which said axis of pivotal motion of the direction changing levers is sloped upwardly and inwardly toward the rear.

* * * * *